United States Patent

[11] 3,620,875

[72] Inventors Richard J. Guglielmo, Sr.
  Cresskill, N.J.;
  Nishan G. Chookazian, Saddle Brook, N.Y.
[21] Appl. No. 849,244
[22] Filed July 28, 1969
[45] Patented Nov. 16, 1971
[73] Assignee EMA Corporation
  Northvale, N.J.
  Continuation-in-part of application Ser. No.
  417,804, Dec. 11, 1964, now abandoned,
  Continuation of application Ser. No.
  500,168, Oct. 21, 1965, now abandoned.
  This application July 28, 1969, Ser. No.
  849,244

[54] ELECTROMAGNETIC ADHESIVE AND METHOD OF JOINING MATERIAL THEREBY
  13 Claims, No Drawings
[52] U.S. Cl. .................................................... 156/272,
  156/273, 156/306, 260/37, 260/39, 260/41
[51] Int. Cl. ........................................................ B29c 27/04,
  C08f 45/04, C08k 1/02

[50] Field of Search .................................... 156/272-273,
  306, 380; 264/25-26;
  252/62.53-62.55, 513; 260/37 M, 39 M, 41 B;
  117/227

[56] References Cited
UNITED STATES PATENTS

| | | | |
|---|---|---|---|
| 3,461,014 | 8/1969 | James ............................ | 156/272 |
| 1,813,425 | 7/1931 | Rosaire ......................... | 156/272 |
| 2,087,480 | 7/1937 | Pitman .......................... | 156/273 |
| 2,393,541 | 1/1946 | Kohler ........................... | 156/272 |
| 2,833,030 | 5/1958 | Peaslee .......................... | 260/41 X |
| 3,143,364 | 8/1964 | Klein ............................. | 260/41 X |
| 3,359,145 | 12/1967 | Salyer et al. .................. | 252/513 X |

Primary Examiner—John T. Goolkasian
Assistant Examiner—George W. Moxon, II
Attorney—Philip D. Junkins ABSTRACT: Electromagnetic adhesive comprised of a mixture of a thermoplastic material and ferromagnetic particles having mesh sizes of from 20–200 mesh. The adhesives are employed to bond thermoplastics by the use of inductive heating, the bonding being effected in period of less than two minutes.

ELECTROMAGNETIC ADHESIVE AND METHOD OF JOINING MATERIAL THEREBY

The invention is a continuation-in-part of application Ser. No. 417,804 filed Dec. 11, 1964 entitled Method of Joining Materials and Joint Obtained Thereby and a continuation of Ser. No. 500,168 filed Oct. 21, 1965 entitled Electromagnetic Adhesive and Method of Joining Materials Thereby, both of which are now abandoned.

This invention relates to an improved method of joining materials and to the high strength joint obtained thereby and, more particularly, to an improved method of rapidly bonding rigid members made of untreated thermoplastic materials.

The complexity of design of articles molded of plastic materials and the increased size of molded plastic articles in recent years has dictated that such articles, in many instances, by molded in sections which are thereafter joined by one or more of the well known bonding or sealing techniques. Classic among bonding methods for thermoplastic materials, such as the polyolefins, are: (i) the application of commercial adhesives; (ii) the use of hot melt adhesives; and (iii) spin welding. More recently various attempts have been made to bond opposing thermoplastic surfaces by melting and joining the thermoplastic in the vicinity of the opposing contact faces or surfaces by: electromagnetic techniques including microwave radiation and dielectric or induction heating; and ultrasonic heating techniques.

The use of conventional adhesives, such as silicone and epoxy cements, rubber based cements, etc., in the bonding of contact faces of plastic structures to be effective requires extensive preliminary surface conditioning. Such conditioning may include acid washing, flame pretreatment or hot air oxidation and even with such preliminary surface treatments shear and peal resistant bonds may not be achieved. Spin welding has the limitation of being applicable only to bond areas which are circular whereas, hot melt adhesives yield low shear strength bonds which cold flow easily. All of such bonding methods become expensive and time-consuming when bond surface pretreatment is required, particularly where the bond design or the configurations of the opposing surfaces to be bonded are such that automated fabrication techniques can not be utilized. The most important deficiency of these techniques is that the resulting bond is not a structural or physical union of the so bonded materials in the bonding zone.

The use of electromagnetic heating methods for bonding plastic materials, particularly large items, has become popular since high strength structural bonding of such materials can often be accomplished. Likewise, ultrasonic welding, where practical, yields a structural bond.

In addition to the establishment of high strength bonds, the application of electromagnetic and ultrasonic bonding techniques results in: (i) elimination of solvents; (ii) elimination of costly bonding surface pretreatments; (iii) bond "setting" accomplished in a matter of seconds; (iv) automated part handling and assembly; and (v) fabrication of complex plastic structures incapable of unitary molding.

The joint formed by electromagnetic or ultrasonic heating methods is actually a seal of transitional composition, the plastic materials of the abutting surfaces, or such surfaces and an interposed gasket blending into each other to form an integral structure having strength at the point of seal equal to, or in excess of, the plastic materials to be bonded.

Ultrasonic bonding or welding systems utilize the acoustical properties of the material to be bonded. High frequency electrical energy (medium Kilocycle range) is converted into mechanical vibrations or pulses which are coupled (usually by a horn or resonant mechanism) to the parts being welded. The vibrations travel through the parts to their common joint line where the mechanical or acoustical energy is dissipated in the form of heat. The heat generated is great enough to raise the temperature of the plastic at the interfaces to its melting point almost instantaneously, the remainder of the parts remaining relatively cool. After melting takes place, the ultrasonic energy is discontinued with the parts mechanically maintained in their desired bonded position for a short period of time to allow the joint to solidify.

When contemplating ultrasonic welding, a few basic parameters must be considered. Most important is the suitability of the material to such technique. If the material is an inefficient transmitter of vibrations, limited welding will occur. Also, joint design is critical to the establishment of a strong bond. Ideally this technique requires a joint design in which the initial contact area is small. The technique is less likely to yield acceptable high strength bonds with nylon, polypropylenes, polyethylenes, and acetates than with polystyrenes and polycarbonates. The former materials are relatively poorer transmitters of vibrations. Ultrasonic heating techniques have not been successfully applied to nonrigid forms of the aforementioned plastics.

As previously mentioned, electromagnetic heating and bonding can be accomplished by three basic types of heat energy creating techniques namely: (i) microwave generation; (ii) dielectric energy generation; and (iii) magnetic energy induction. MIcrowave ovens use a high frequency electromagnetic energy source. Microwave frequencies fall in a range next to infrared in the electromagnetic spectrum. The waves are generated into a cavity from a magnetron source. The radiation is absorbed to various degrees by different nonconducting plastic materials. For example, polyethylene and polypropylene absorb very little whereas, relatively speaking, certain organic and inorganic fillers absorb significantly more of such radiation.

Dielectric heating as a bonding mechanism for plastic materials takes advantage of the normal nonconducting characteristics of such materials, the heating resulting from the dissipation of energy in the rapid reversal of the polarization of the molecules by means of a high frequency electromagnetic field. Dielectric heaters are, in essence, alternating current generators and operate in the megacycle frequency range. The item to be heated acts as a capacitance load. Polar plastics (such as polyvinyl chloride) are materials that can be heated dielectrically. The degree of polarization, electrical frequency, and applied electrode potential are important considerations in the design of dielectric heaters for specific materials to be heated.

Induction heaters are similar, but not identical, to dielectric heaters. The following differences exist: (i) magnetic properties are substituted for dielectric properties; (ii) a coil is employed to couple the load rather than electrodes or plates; and (iii) induction heaters couple maximum current to the load. The generation of heat by induction operates through the rising and falling of a magnetic field around a conductor with each reversal of an alternating current source. The practical deployment of such field is generally accomplished by proper placement of a conductive coil. When another electrically conductive material is exposed to the field, induced current can be created. These induced currents can be in the form of random or "eddy" currents. They result in the generation of heat. Materials which are both magnetizable and conductive generate heat more readily than materials which are only conductive. The heat generated as a result of the magnetic component is the result of hysteresis or work done in rotating magnetizable molecules and as a result of eddy current flow. Polyolefins and other plastics are neither magnetic nor conductive in their natural states. Therefore, they do not, in themselves, create heat as a result of induction.

The use of the electromagnetic induction heating method for bonding thermoplastic structures has proved feasible because such plastics are in and of themselves electromagnetically transparent, i.e., the electromagnetic radiation when applied within established frequency ranges passes into, around and through such plastics without materially affecting the same. By interposing selected electromagnetic energy absorbing materials: (i) between the plastic surfaces to be bonded; (ii) within the plastic materials in the vicinity of the surfaces to be bonded; or (iii) in an independent bonding layer or gasket conforming to the surfaces to be bonded, electromagnetic energy passing through the adjacent plastic structures (free of such energy absorbing materials) is readily concentrated and absorbed in the bonding area by such energy absorbing materials thereby rapidly heating the same. Heat will be transferred by conduction from the electromagnetic energy absorbing material, or the bond layer containing such energy absorbing material, to the abutting plastic surfaces to be bonded. If the temperature of each abutting surface is raised rapidly to a temperature just in excess of its melting point and thereafter the electromagnetic heating is discontinued, the heat at the abutting surfaces will result in heat bonding thereof without destructive heat penetration in the surrounding plastic material. As a result, the basic strengths and structure of the articles to be bonded will be maintained.

Electromagnetic energy absorbing materials of various types have been used in the electromagnetic induction heating technique for some time. For instance, inorganic oxides; powdered metals and carbonaceous compositions have been incorporated in bond layers and subjected to electromagnetic radiation. In each instance, the type of energy source influences the selection of energy absorbing material. Where the energy absorbing material is comprised of finely divided particles (200–300 mesh or of larger mesh numbers) having ferromagnetic properties and such particles are effectively insulated from each other by particle containing nonconducting matrix material, the heating effect is substantially confined to that resulting from the effects of hysteresis. Consequently, heating is limited to the "Curie" temperature of the ferromagnetic material or the temperature at which the magnetic properties of such material cease to exist.

Process conditions are important considerations in the use of the preferred induction heating form of electromagnetic bonding techniques. With respect to the zone of adhesion—whether it be a part of the articles to be bonded or an independent bond layer or gasket interposed between the opposing faces of articles to be bonded—the following factors must be considered: (i) concentration of the energy absorbing materials; (ii) physical and chemical natures of the energy absorbing materials and/or blends thereof; (iii) thickness of the adhesion zone or bond layer; (iv) bond layer matrix materials and blends thereof; and (v) physical form and design of the adhesion zone or bond layer. INduction heating equipment on the other hand must be designed with the following considerations in mind: (a) exposure time; (b) field intensity; (c) electrical frequency; and (d) effective coupling.

It is an object of the present invention to provide an improved electromagnetic induction bonding system for thermoplastic materials.

It is also an object of the invention to provide an improved electromagnetically bonded joint between solid thermoplastic materials, which joint has strength at the point of seal equal to, or in excess of, the strength of the plastic materials to be bonded.

It is a further object of the invention to provide improved electromagnetic adhesive compositions which can be readily handled and applied to opposed surface areas of thermoplastic materials for effectively bonding the same to each other without extensive surface pretreatment and without affecting the basic strengths and structure of such materials during and after the bonding procedure.

Various other features, objects and advantages of the invention will be apparent from the following more detailed description. The invention resides in the novel compositions, methods and combinations of method steps hereinafter described by way of examples and, as will be more particularly pointed out, in the appended claims.

In accordance with the invention, it has been discovered that solid thermoplastic sections can be effectively bonded together by an electromagnetic adhesive composition comprised of: (i) particulate electromagnetic energy absorbing material selected from a group of metals and metal alloys having ferromagnetic characteristics, said particulate materials have a mesh size of from about 20 mesh to about 200 mesh; i.e., the materials pass through a 20 mesh screen and are retained on a 200 mesh screen, and a matrix material, containing such energy absorbing material in substantially uniform and insulated distribution therethrough, consisting of thermoplastic material of like composition to the thermoplastic material of the sections to be bonded, the ratio of energy absorbing material to thermoplastic material in said composition being about 1 part to about 2 parts by weight of said energy absorbing material per 1 part by weight of thermoplastic material.

The electromagnetic adhesive composition of this invention may take the form of an extruded ribbon or wire, a molded gasket or cast sheet. It may be crushed or pelletized. In liquid form it may be applied by brush to surfaces to be bonded or may be sprayed on or used as a dip coating for such surfaces.

Preferably the particulate electromagnetic energy absorbing material is one of the magnetizable metals including iron, cobalt and nickel or magnetizable alloys of nickel and iron and nickel and chromium. These metals and alloys have high Curie points (730°–2,040° F). Because of the preferred mesh size for these particles, in accordance with the invention the particulate electromagnetic energy absorbing material can be heated to temperatures above their respective Curie temperatures as a result of hysteresis and intraparticle eddy current flow. Therefore, with a given amount of available power, higher heating temperatures can be obtained within a substantially reduced time period as compared to inductively heated electromagnetic energy absorbing particles of smaller size (200–300 mesh or of larger mesh numbers).

While completely satisfactory bonds have been established between like thermoplastic surfaces and the electromagnetic adhesive composition above wherein the particulate energy absorbing material has a mesh size range of from about 20 mesh to about 200 mesh, a more preferable range is from about 40 mesh to about 100 mesh. The preferred range of mesh size for such material provides more uniformly sized particulate targets for the induced electromagnetic energy and therefore heating of bonding zone is rapid and more uniform.

The foregoing adhesive composition, when properly utilized as described hereinafter, results in a solvent free bonding system which permits the joining of like thermoplastic items without costly surface pretreatment. The bond created between such items has strength equal to, or greater than, the material itself and the electromagnetically induced bonding reaction occurs rapidly and is adaptable to automated fabrication techniques and equipment. The heating effect is confined to the seam or joint and heating of the entire assembly (as occurs with the dielectric heating method) is avoided with a substantial saving of power and with avoidance of drying out or otherwise injuring the articles being secured together. With a given amount of available power there is also a substantial reduction in the time required for the heating step.

To accomplish the establishment of a concentrated and specifically located heat zone by induction heating in the context of thermoplastic bonding in accordance with the invention, it has been found that the electromagnetic adhesive compositions described above can be activated and a bond created by an induction heating system operating with an electrical frequency of the electromagnetic field of from about 5 to about 30 megacycles and preferably from about 15 to 30 megacycles, said field being generated from a power source of from about 1 to about 30 kilowatts, and preferably from about 2 to about 5 kilowatts. The electromagnetic field is applied to the articles to be bonded for a period of time of less than about 2 minutes.

As heretofore mentioned, the electromagnetic induction bonding system and improved electromagnetic adhesive compositions of the present invention are applicable to the bonding of untreated articles molded of thermoplastic material. The thermoplastics to which this invention is particularly applicable include the polyolefins (polyethylene and polypropylene), polystyrenes, polyamides such as Nylon, and acetals such as Delrin.

The following examples are presented to better illustrate the practical application of the invention to thermoplastic items formed by inductively bonding together sections thereof.

EXAMPLE I

An elliptical dishwasher spray arm (4 inches wide and 16 inches long) injection molded of polypropylene was bonded to a hub section injection molded of polypropylene by means of an electromagnetic adhesive in extruded ribbon form consisting of 2 parts by weight of iron powder (20 to 80 mesh) and 1 part by weight of polypropylene (supplied by Hercules Powder Co.). A 2.5 kilowatt, 5 megacycle induction heating units was utilized to generate an electromagnetic field for inductively heating the iron powder. The extruded ribbon of electromagnetic adhesive was placed between the mating tongue and groove bond areas of the molded parts and the induction heating unit was operated at the indicated ratings for 45 seconds. After setting the molded parts were found to be structurally bonded to each other in all areas adjacent the interposed extruded ribbon of electromagnetic adhesive.

EXAMPLE II

A small two-section injection molded polypropylene vial was assembled using an electromagnetic adhesive in the form of a molded ring. The molded adhesive ring consisted of 2 parts by weight of iron powder (40–100 mesh) and 1 part by weight of polypropylene (supplied by Shell Chemical Co.). A 1.2 kilowatt, 25 megacycle induction heating unit was utilized to generate an electromagnetic field for inductively heating the iron powder. The molded ring of electromagnetic adhesive was placed between the mating annular edges of the vial sections and the induction heating unit was operated at the indicated ratings for 1.5 seconds. After setting the molded vial sections were found to be structurally bonded to each other in the annular areas adjacent the interposed molded adhesive ring.

EXAMPLE III

An electromagnetically activatable adhesive having exceptional utility for bonding rigid polypropylene structures has been produced in accordance with the invention by: intimately mixing 57 parts by weight of iron powder (40–100 mesh) with 43 parts by weight of polypropylene powder (3.0 melt flow); and pressing the mixture into gaskets or bonding layers having a thickness of about 30 mils. The bonding reaction (electromagnetic induction heating) for such gaskets or bonding layers may be accomplished in about 1 second by an induction heating unit having a rating of 5 kilowatts intensity and 25 megacycles frequency.

EXAMPLE IV

An electromagnetically activatable adhesive having exceptional utility for bonding rigid polyethylene structures has been produced in accordance with the invention by: intimately mixing 66.6 parts by weight of iron powder (40–100 mesh) with 33.4 parts by weight of linear polyethylene powder (9.0 melt index); and extruding the mixture as a ½ wide ribbon having a thickness of about 30 mils. The bonding reaction (electromagnetic induction heating) for such ribbon bonding material may be accomplished in about 7 seconds by an induction heating unit having a rating of 5 kilowatts intensity and 25 megacycles frequency.

EXAMPLE V

Automobile battery cell components molded of Nylon (polyamide thermoplastic) were assembled using an electromagnetic adhesive in sheet form. The adhesive sheets were formed by intimately mixing 57 parts by weight of iron powder (40–100 mesh) with 43 parts by weight of molding grade Zytel No. 31 Nylon (supplied by duPont); and pressing the mixture into sheet type bonding layers of desired configuration, said sheets having a final pressed thickness of 25 mils. The bonding reaction (electromagnetic induction heating) for such bonding layers interposed at appropriate points between the battery components) was accomplished in about 2 minutes by an induction heating unit generating an electromagnetic field of X 1.2 kilowatts intensity at 5 megacycles frequency.

EXAMPLE VI

Ice bucked components molded of Styrafoam (foamed polystyrene) were assembled using an electromagnetic adhesive in sheet form. The adhesive sheets were formed by intimately mixing 66.6 parts by weight of iron powder (40–100 mesh) with 33.4 parts by weight of styrene pellets (supplied by Koppers Corp.); and pressing the mixture into sheet type bonding layers of desired configuration, said sheets having a final pressed thickness of 25 mils. The bonding reaction (electromagnetic induction heating) for such bonding layers (interposed at appropriate points between the ice bucket components) was accomplished in about 1 second by an induction heating unit generating an electromagnetic field of 1.2 kilowatts intensity at 5 megacycles frequency.

EXAMPLE VII

An electromagnetically activatable adhesive having exceptional utility for bonding rigid polyethylene structures has been produced in accordance with the invention by: intimately mixing 57 parts by weight of nickel powder (97.5% Ni/2.5% Cr :40–100 mesh) with 43 parts by weight of polyethylene powder (9.0 melt index); and pressing the mixture into gaskets or bonding layers having a final pressed thickness of about 30 mils. The bonding reaction electromagnetic induction heating) for such gaskets or bonding layers (interposed between polypropylene structures to be bonded) can be accomplished in about 2 seconds by an induction heating unit generating an electromagnetic field of 1.2 kilowatts intensity at 25 megacycles frequency.

EXAMPLE VIII

An electromagnetically activatable liquid adhesive having exceptional utility for bonding rigid polypropylene structures and for bonding polypropylene film for packaging applications has been produced in accordance with the invention by: intimately mixing 120 parts by weight of iron powder (20–80 mesh supplied by Hoegannaes Corporation) with 100 parts by weight of a 30 percent Xylol solution of Tennessee Eastman atactic polypropylene (Epolon D–10); and applying the mixture to the interfaces to be bonded by brushing, spraying, dipcoating or printing. This electromagnetic liquid adhesive, having thick paint-like consistency, is activatable as a bonding medium in from several seconds to less than about 2 minutes by induction heating units generating an electromagnetic field of 1 to 5 kilowatts intensity at 5 to 25 megacycles frequency.

EXAMPLES IX to XII

Further examples of electromagnetically activatable adhesives (prepared and utilized in accordance with the invention) are set forth below. In each example the material to be bonded was polypropylene in the form of standard tensile test bars which had been severed midway between their ends and rejoined for tensile test purposes by the adhesive of the invention. The test bars were of ProFax brand polypropylene supplied by Hercules Powder Co.

EXAMPLE IX

| | |
|---|---|
| Ferromagnetic Particles | 67 pbw Ni(50%)/Fe(50%) powder (200 mesh) |
| Thermoplastic Matrix | 33 pbw W–550 polypropylene Supplied by Shell Chemical Co. |
| Electromagnetic Field | 1.2 kilowatts/15 megacycles |
| Bonding Time | 5.1 seconds |

EXAMPLE X

| | |
|---|---|
| Ferromagnetic Particles | 50 pbw Ni(50%)/Fe(50%) powder (200 mesh) |
| Thermoplastic Matrix | 50 pbw Escon 107 polypropylene Supplied by Enjay Chemical Co. |
| Electromagnetic Field | 1.2 kilowatts/15 megacycles |
| Bonding Time | 7.0 seconds |

EXAMPLE XI

| | |
|---|---|
| Ferromagnetic Particles | 50 pbw Nickel powder (200 mesh) |

| | |
|---|---|
| Thermoplastic Matrix | 50 pbw Escon 107 polypropylene Supplied by Enjay Chemical Co. |
| Electromagnetic Field | 1.2 kilowatts/15 megacycles |
| Bonding Time | 4.5 seconds |

EXAMPLE XII

| | |
|---|---|
| Ferromagnetic Particles | 50 pbw Ni(97.5%)/Cr.(2.5%) powder (40–100 mesh) |
| Thermoplastic Matrix | 25 pbw Escon 107 polypropylene Supplied by Enjay Chemical Co. 25 pbw D-10 amorphous polypropylene Supplied by Tennessee Eastman Corp. |
| Electromagnetic Field | 1.2 kilowatts/15 megacycles |
| Bonding Time | 1.5 seconds |

EXAMPLES XII TO XIV

Additional examples of electromagnetically activatable adhesives (prepared and utilized in accordance with the invention) are set forth below. In example XIII the material to be bonded was polyethylene in the form of a standard tensile test bar which had been severed midway between its ends and rejoined for tensile test purposes by the adhesive of the invention. The test bar was HiFax brand polyethylene supplied by Hercules Powder Co. In example XIV the parts to be bonded were molded of Delrin acetal thermoplastic supplied by duPont.

EXAMPLE XIII

| | |
|---|---|
| Ferromagnetic Particles | 57 pbw Cobalt powder (200 mesh) |
| Thermoplastic Matrix | 43 pbw high density polyethylene Supplied by Grace Chemical Co. |
| Electromagnetic Field | 1.2 kilowatts/15 megacycles |
| Bonding Time | 84 seconds |

EXAMPLE XIV

| | |
|---|---|
| Ferromagnetic Particles | 57 pbw Iron powder (40–100 mesh) |
| Thermoplastic Matrix | 43 pbw Delrin acetal thermoplastic Supplied by duPont |
| Electromagnetic Field | 1.2 kilowatts/20 megacycles |
| Bonding Time | 30 seconds |

EXAMPLE XV

A series of experiments were conducted to show the effect of increasing the ratio of metal loading in electromagnetic energy absorbing materials. In each experiment polyethylene containers (3.0 inch diameter) were effectively sealed to polyethylene covers of like diameter. The electromagnetically activatable adhesive (polyethylene/iron) in each case was molded as an O-ring (3.0 inch diameter) of 0.05 inch thickness and width. The induction heating unit generated an electromagnetic field of 5.0 kilowatts intensity at 25 megacycles frequency.

| Exp. | Metal Powder | Mesh | Metal/PE (p.b.w.) | Sealing Time (seconds) |
|---|---|---|---|---|
| a) | Fe | 40–100 | 50/50 | 13.0 |
| b) | Fe | 40–100 | 57/43 | 12.3 |
| c) | Fe | 40–100 | 67/33 | 8.6 |

It will be readily observed that by increasing the ratio of metal loading in electromagnetic energy absorbing materials of like plastics matrix the sealing times are reduced.

Using the same container/cover combination and sizes, additional experiments were conducted using a like energy supply with O-rings comprised of different metal powders but having like metal loading ratios (pbw metal/pbw of matrix). In each case effective seals were made when the electromagnetic adhesive was subjected to induction heating for the times indicated.

| Experiment | Metal powder | Mesh | Metal/PE (pbw.) | Sealing times (seconds) |
|---|---|---|---|---|
| (d) | 97.5%Ni/2.5%Cr | 40–100 | 57/43 | 9.9 |
| (e) | 50.0%Co/50.0%Fe | 40–100 | 57/43 | 10.3 |
| (f) | 50.0%Ni/50.0%Fe | 40–100 | 57/43 | 11.6 |
| (g) | Fe | 40–100 | 57/43 | 12.3 |

From the above experiments d) through g) it will be seen that surprisingly there is a synergistic effect (reduced sealing times) where ferromagnetic alloys are utilized as the electromagnetic energy absorbing material rather than iron alone where mesh sizes and metal loading ratios are constant.

While the invention has been described in detail with respect to certain preferred examples, it will be understood by those skilled in the art after understanding the invention that various changes and modification may be made without departing from the spirit and scope of the invention, and it is intended therefore in the appended claims to cover all such changes and modifications.

We claim:

1. A method for sealably joining opposed section of untreated nonconducting thermoplastic material which comprises:
   interposing therebetween at all areas where sealing is to be effected a relatively thin bonding layer of like thermoplastic material in which there is uniformly dispersed ferromagnetic particles having particle sizes which pass through a 20 mesh screen and do not pass through a 200 mesh screen, whereby upon application of an induced electromagnetic field said particles are rapidly heatable by hysteresis and eddy current effects to a temperature above the Curie temperature of said particles;
   subjecting said opposed thermoplastic sections and interposed bonding layer to an electromagnetic field of sufficient power and frequency to inductively heat said dispersed particles whereby the thermoplastic materials of said bonding layer and the areas of said thermoplastic sections to be sealed are rapidly heated to above their melting points; and
   terminating said electromagnetic field after a heating time of less than about 2 minutes whereby the adjacent melted portions of said thermoplastic sections and said bonding layer become intimately fused forming a high strength structural joint between said sections.

2. The method as defined in claim 1 wherein the weight ratio of ferromagnetic particles passing through a 20 mesh screen and not passing through a 200 mesh screen to thermoplastic material is from about 1:1 to about 2:1.

3. The method as defined in claim 2 wherein the ferromagnetic particles is a member selected from the group consisting of iron, cobalt, nickel, alloys containing nickel, alloys containing cobalt and alloys containing iron.

4. The method as defined in claim 3 wherein the thermoplastic material is selected from the group consisting of polyolefins, polystyrenes polyamides and acetals.

5. The method as defined in claim 3 wherein the electromagnetic field has a field intensity of from about 1 to about 30 kilowatts and a frequency from about 5 to about 30 megacycles.

6. The method as defined in claim 3 wherein the ferromagnetic particles are of a size which pass through a 40 mesh screen and do not pass through a 100 mesh screen.

7. An electromagnetically activatable adhesive composition, comprising a substantially uniform mixture of thermoplastic material and ferromagnetic particles, said ferromagnetic particles having particle sizes which pass through a 20 mesh screen and do not pass through a 200 mesh screen, whereby upon application of an induced electromagnetic field said particles are rapidly heatable by hysteresis and eddy current effects to a temperature above the Curie temperature of said particles.

8. The adhesive as defined in claim 7 wherein the weight ratio of ferromagnetic particles passing through a 20 mesh screen and not passing through a 200 mesh screen to thermoplastic material is from about 1:1 to about 2:1.

9. The adhesive composition as defined in claim 8 wherein the ferromagnetic particles is a member selected from the group consisting of iron, cobalt, nickel, alloys containing nickel, alloys containing cobalt and alloys containing iron.

10. The adhesive as defined in claim 9 wherein the thermoplastic material is selected from the group consisting of polyolefins, polystyrenes, polyamides and acetals.

11. The adhesive composition as defined in claim 9 wherein the composition is in the form of a solid sheet.

12. The adhesive composition as defined in claim 9 wherein the composition is in the form of a ribbon.

13. The adhesive as defined in claim 9 wherein the ferromagnetic particles are of a size which pass through a 40 mesh screen and do not pass through a 100 mesh screen.

* * * * *